(12) United States Patent
Hidalgo et al.

(10) Patent No.: US 7,189,869 B2
(45) Date of Patent: Mar. 13, 2007

(54) METHOD FOR MAKING POLYCARBONATE

(75) Inventors: Gerardo Hidalgo, Cartagena Murcia (ES); Patrick J. McCloskey, Watervliet, NY (US); Alberto Nisoli, Niskayuna, NY (US); Lina Prada, Murcia (ES)

(73) Assignee: General Electric Company, Schenectady, NY (US)

( * ) Notice: Subject to any disclaimer, the term of this patent is extended or adjusted under 35 U.S.C. 154(b) by 87 days.

(21) Appl. No.: 10/979,608

(22) Filed: Nov. 1, 2004

(65) Prior Publication Data

US 2006/0094856 A1    May 4, 2006

(51) Int. Cl.
*C07C 69/96*    (2006.01)
(52) U.S. Cl. .................. 558/265; 558/270
(58) Field of Classification Search .......... 558/265, 558/270
See application file for complete search history.

(56) References Cited

U.S. PATENT DOCUMENTS

| | | | |
|---|---|---|---|
| 4,873,314 A | 10/1989 | Berg et al. | |
| 5,734,004 A | 3/1998 | Kuhling et al. | |
| 5,747,609 A | 5/1998 | Komiya et al. | |
| 5,922,287 A | 7/1999 | Kato et al. | |
| 5,922,826 A | 7/1999 | Kuze et al. | |
| 5,929,192 A | 7/1999 | Miyauti et al. | 528/196 |
| 6,228,973 B1 | 5/2001 | McCloskey et al. | 528/196 |
| 6,277,945 B1 | 8/2001 | Hachiya et al. | |
| 6,316,575 B1 | 11/2001 | Kuze et al. | |
| 6,323,302 B1 | 11/2001 | Sasaki et al. | |
| 6,339,138 B1 | 1/2002 | van Hout et al. | 528/196 |
| 6,403,754 B1 | 6/2002 | McCloskey et al. | |
| 6,472,498 B2 | 10/2002 | Sugise et al. | |
| 6,506,871 B1 | 1/2003 | Silvi et al. | |
| 6,740,729 B1 | 5/2004 | Tanaka et al. | |
| 2002/0095020 A1 | 7/2002 | Hucks et al. | 528/196 |
| 2003/0050427 A1 | 3/2003 | Brunelle et al. | |
| 2003/0236384 A1 | 12/2003 | Silvi et al. | 528/86 |
| 2005/0010063 A1 | 1/2005 | Murthy et al. | |

FOREIGN PATENT DOCUMENTS

| | | |
|---|---|---|
| EP | 1018529 A1 | 7/2000 |
| JP | 10060106 | 3/1998 |
| LU | 88564 | 4/1995 |
| LU | 88569 | 4/1995 |
| WO | WO 9303084 | 2/1993 |

OTHER PUBLICATIONS

Hidalgo, et al. "Method for Making Polycarbonate" U.S. Appl. No. 10/979,479, filed Nov. 1, 2004.
Office Action for related U.S. Appl. No. 10/979,479, filed Jul. 15, 2005.
International Search Report, International Application No. PCT/US2005/038553, International Filing Date: Oct. 27, 2005, Date of Mailing: Aug. 3, 2006, 6 pages.
International Search Report, International Application No. PCT/US2005/038376, International Filing Date: Oct. 27, 2005, Date Mailing: Mar. 3, 2006, 6 pages.
JP Patent No. 10060106; Publication Date: Mar. 3, 1998; Abstract Only; 1 page.
JP2000128976A; May 9, 2000; Manufacturing Method of Polycarbonate; English Translation.
JP2000128976; May 9, 2000; Manufacturing of Polycarbonate; Abstract Only; one page.

*Primary Examiner*—Taofiq Solola

(57) ABSTRACT

A method of making polycarbonates comprises melt-polymerizing an aromatic dihydroxy compound and a carbonic acid diester in a presence of a polymerization catalyst in a reactor system producing a byproduct stream, wherein the polymerization catalyst comprises a quaternary phosphonium compound; and purifying the byproduct stream to separate phenol, wherein the separated phenol has a phosphorus concentration of less than or equal to about 3 part per million, based upon the total weight of the phenol separated.

20 Claims, 1 Drawing Sheet

METHOD FOR MAKING POLYCARBONATE

BACKGROUND

This disclosure is directed to a method for manufacturing polycarbonates.

Aromatic polycarbonates have been widely adopted for use as engineering plastics in many fields because of their excellent mechanical properties such as high impact resistance, heat resistance, transparency, and the like.

Polycarbonates can be manufactured by reacting an aromatic dihydroxy compound with a carbonic acid diester in the presence of a polymerization catalyst. For example, the method of making an aromatic polycarbonate generally comprises an ester interchange reaction (melt polymerization method) between an aromatic dihydroxy compound and a carbonic acid diester using an alkali metal salt as the catalyst. It is noted that this method of manufacturing aromatic polycarbonates has attracted recent attention because it is inexpensive and does not employ toxic substances such as phosgene and methylene chloride. As such, this method is more advantageous from a health and environmental perspective compared to other methods employing, for example, phosgene and methylene chloride.

Separation and reuse of byproducts and recyclable components from a polymerization reaction is important, if a method to prepare polycarbonates is to be economically viable and environmentally safe. In particular, when a reactant like diphenyl carbonate is separated in the polymerization reaction, it is desirable that a reusable form of the reactant be separated and recycled efficiently.

SUMMARY

Disclosed herein are methods of making polycarbonate.

One embodiment of a method of making polycarbonates can comprise melt-polymerizing an aromatic dihydroxy compound and a carbonic acid diester in a presence of a polymerization catalyst in a reactor system producing a byproduct stream, and purifying the byproduct stream to separate phenol. The polymerization catalyst can comprise a quaternary phosphonium compound, and the separated phenol can have a phosphorus concentration of less than or equal to about 3 ppm.

Another embodiment of a method for making polycarbonate can comprise melt-polymerizing bisphenol A and diphenyl carbonate in the presence of tetrabutylphosphonium acetate and sodium hydroxide in a multistage reactor comprising a first reactor, a second reactor disposed downstream of the second reactor, a third reactor disposed downstream of the second reactor, and a fourth reactor disposed downstream of the third reactor. The first reactor can comprise a first reactor byproduct stream, the second reactor can comprise a second reactor byproduct stream, the third reactor can comprise a third reactor byproduct stream, and the fourth reactor can comprise a fourth reactor byproduct stream. Phenol can be separated from the first reactor byproduct stream using a scrubber disposed in fluid communication with the first reactor. Phenol can be separated from the second, third, and fourth byproduct streams using a first distillation column, wherein the first distillation column can produce a first top stream and a first bottom stream, wherein the first top stream can comprise greater than or equal to about 99 wt. % phenol and less than or equal to about 3 ppm phosphorous, wherein the weight percent of phenol is based upon a net weight of the phenol separated in the first purifying column. Phenol can be separated from the first bottom stream using a second distillation column, wherein the second distillation column can produce a second top stream and a second bottom stream, wherein the second top stream can comprise greater than or equal to 90 wt. % phenol and less than or equal to about 3 ppm phosphorous, wherein the weight percent of phenol is based upon a net weight of the phenol separated in the second distillation column.

The above-described and other features will be appreciated and understood by those skilled in the art from the following detailed description, drawings, and appended claims.

BRIEF DESCRIPTION OF THE DRAWINGS

Referring now to the figure, which is an exemplary embodiment and wherein the like elements are numbered alike.

DETAILED DESCRIPTION

Figure 1:
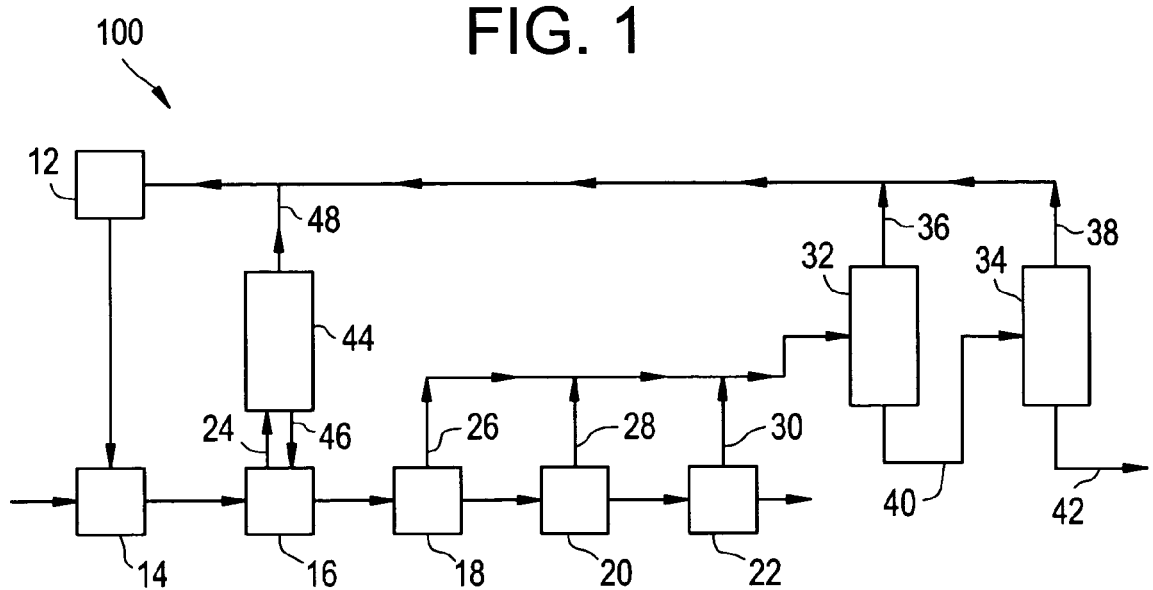
FIG. 1 is a schematic diagram illustrating an exemplary embodiment of a system suitable for making polycarbonate.

It is first noted that the terms "first," "second," and the like, herein do not denote any amount, order, or importance, but rather are used to distinguish one element from another, and the terms "a" and "an" herein do not denote a limitation of quantity, but rather denote the presence of at least one of the referenced item. Additionally, all ranges disclosed herein are inclusive and combinable (e.g., the ranges of "up to 25 wt. %, with 5 wt. % to 20 wt. % desired," are inclusive of the endpoints and all intermediate values of the ranges of "5 wt. % to 25 wt. %," etc.). Unless defined otherwise, technical and scientific terms used herein have the same meaning as is commonly understood by one of skill in the art. The modifier "about" used in connection with a quantity is inclusive of the stated value and has the meaning dictated by the context, (e.g., includes the degree of error associated with measurement of the particular quantity).

Additionally, it is noted that the phrase "net total weight" is used throughout this disclosure in regards to a given material being separated. It is to be understood by those skilled in the art that this phrase refers to a material balance of the given material exiting the separation device (e.g., purifying column, distillation column, and the like). For example, if a distillation column comprises a top stream and a bottom stream, wherein 90 wt. % of a given material is in the top stream based upon a total weight of the given material separated, the remaining 10 wt. % is in the bottom stream. Moreover, it is to be understood that this information can readily be manipulated by one of skill in the art to determine the weight percent of the given material based on a total weight of materials in one stream, e.g., the top stream.

In describing the arrangement of devices (e.g., reactors, purifying devices, and the like) within a system, the terms "upstream" and "downstream" are used. These terms have their ordinary meaning. However, it is envisioned that a device may be both "upstream" and "downstream" of the same device in certain configurations, e.g., a system comprising a recycle loop.

Polycarbonates can be prepared by reacting an aromatic dihydroxy compound with a carbonic acid diester in the presence of a polymerization catalyst. Suitable polymerization catalysts include, but are not limited to, a phosphorous containing compound (e.g., a quaternary phosphonium compound). The carbonic acid diester employed in making the polycarbonate comprises a phosphorous concentration of less than or equal to about 30 parts per million, based upon the total weight of the carbonic acid diester. Suitable aromatic polycarbonates can possess recurring structural units of the formula (I):

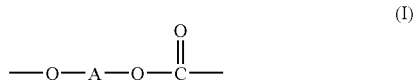

wherein A is a divalent aromatic radical of the dihydroxy compound employed in the polymer reaction.

The aromatic dihydroxy compound that can be used to form aromatic carbonate polymers, are mononuclear or polynuclear aromatic compounds, containing as functional groups two hydroxy radicals, each of which can be attached directly to a carbon atom of an aromatic nucleus. Suitable dihydroxy compounds are, for example, resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,1-bis(4-hydroxyphenyl)methane, 1,1-bis(4-hydroxyphenyl)ethane, 1,2-bis(4-hydroxyphenyl)ethane, 1,1-bis(4-hydroxyphenyl)-1-phenylethane, 2,2-bis(4-hydroxyphenyl)propane ("bisphenol A"), 2-(4-hydroxyphenyl)-2-(3-hydroxyphenyl)propane 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, bis(4-hydroxyphenyl)phenylmethane, 2,2-bis(4-hydroxy-1-methylphenyl) propane, 1,1-bis(4-hydroxy-tert-butylphenyl)propane, 2,2-bis(4-hydroxy-3-bromophenyl)propane, and 1,1-bis (hydroxyphenyl) cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, alpha.alpha.'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane 2,2-bis(3-cyclohexyl-4- hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, 2,7-dihydroxycarbazole and the like, as well as combinations and reaction products comprising at least one of the foregoing dihydroxy compounds.

In various embodiments, two or more different aromatic dihydroxy compounds or a copolymer of an aromatic dihydroxy compound with a glycol, with a hydroxy- or acid-terminated polyester or with a dibasic acid or hydroxy acid in the event a carbonate copolymer or interpolymer rather than a homopolymer for use in the preparation of the aromatic polycarbonate mixtures, can be employed in making the polycarboante. Polyarylates, polyester-carbonate resins, and/or blends comprising at least one of the foregoing can be employed. In an exemplary embodiment, the aromatic dihydroxy compound is bisphenol A.

Examples of carbonic acid diesters suitable for use, include, but is not limited to, diphenyl carbonate, ditolyl carbonate, bis(chlorophenyl) carbonate, m-cresyl carbonate, dinaphthyl carbonate, bis(diphenyl) carbonate, diethyl carbonate, diethyl carbonate, dibutyl carbonate, and dicyclohexyl carbonate, and the like, as well as combinations and reaction products comprising at least one of the foregoing carbonic acid diesters. More particularly, the carbonic acid diester can be diphenyl carbonate (DPC).

The method to produce diphenyl carbonate involves reaction of an aromatic monohydroxy compound, which is convertible to a carbonate ester. Suitable aromatic hydroxy compounds include monocyclic, polycyclic or fused polycyclic aromatic monohydroxy or polyhydroxy compounds having from 6 to 30, and particularly from 6 to 15 carbon atoms. Illustrative examples include mono- and poly-hydroxy compounds such as phenol, alkylphenols, o-, m- and p-cresol, o-, m- and p-chlorophenol, o-, m- and p-ethylphenol, o-, m- and p-propylphenol, o-, m- and p-methoxyphenol, methyl salicylate, 2,6 dimethylphenol, 2,4-dimethylphenol, 1-naphthol, 2-naphthol, xylenol, resorcinol, hydroquinone, catechol, cumenol, the various isomers of dihydroxynaphthalene, bis(4-hydroxyphenyl)propane-2,2, alpha.,alpha-bis(4-hydroxyphenyl)-p-di isopropylbenzene, bisphenol A, and the like, as well as combinations and reaction products comprising at least one of the foregoing can be used. Particularly, the aromatic monohydroxy compound can be phenol.

In preparing the aromatic polycarbonates, about 1.0 mole to about 1.30 moles of carbonic acid diester can be used for every mole of the aromatic dihydroxy compound. More particularly, about 1.01 moles to about 1.15 moles of carbonic acid diester can be employed.

In an embodiment, the catalyst composition comprises a quaternary phosphonium compound. Quaternary phosphonium compounds include quaternary phosphonium compounds having structure II

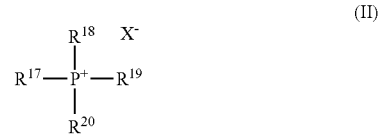

wherein $R^{17}$–$R^{20}$ are independently a $C_1$–$C_{20}$ alkyl group, $C_4$–$C_{20}$ cycloalkyl group, or a $C_4$–$C_{20}$ aryl group; and X— is an organic or inorganic anion.

Quaternary phosphonium compounds II are illustrated by tetamethylphosphonium hydroxide, tetrabutylphosphonium acetate, tetrabutylphosphonium hydroxide, and the like, and combinations comprising one or more of the foregoing compounds.

In structure II, the anion X— is hydroxide, halide, carboxylate, phenoxide, sulfonate, sulfate, carbonate, or bicarbonate. Where X— is a polyvalent anion such as carbonate or sulfate it is understood that the positive and negative charges in structure II are properly balanced. For example, in tetrabutylphosphonium carbonate where $R_{17}$–$R_{20}$ in structure II are each butyl groups and X— represents a carbonate anion, it is understood that X— represents ½ ($CO_3^{-2}$).

The catalyst further comprises an alkali element compound, an alkaline earth metal compound, or a combination comprising one or more of the foregoing catalysts. Examples of suitable alkali elements include lithium, sodium, potassium, cesium, and rubidium, while examples of alkaline earth metals include magnesium calcium, and strontium. Examples of alkali element compounds include sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, lithium stearate, sodium stearate, potassium stearate, lithium hydroxyborate, sodium hydroxyborate, sodium phenoxyborate, sodium benzoate, potassium benzoate, lithium benzoate, disodium hydrogen phosphate, dipotassium hydrogen phosphate, dilithium hydrogen phosphate, disodium salts, dipotassium salts, and dilithium salts of bisphenol A, and sodium salts, potassium salts, and lithium salts of phenol, and combinations comprising one or more of the foregoing alkali element compounds. Examples of alkaline earth metal compounds include calcium hydroxide, barium hydroxide, magnesium hydroxide, strontium hydroxide, calcium bicarbonate, barium bicarbonate, magnesium bicarbonate, strontium bicarbonate, calcium carbonate, barium carbonate, magnesium carbonate, strontium carbonate, calcium acetate, barium acetate, magnesium acetate, strontium acetate, and strontium stearate, and combinations comprising one or more of the foregoing alkaline earth metal compounds.

The catalyst can further comprise at least one salt of a non-volatile acid. By "non-volatile" it is meant that the acid from which the catalyst is made has no appreciable vapor pressure under melt polymerization conditions. Examples of non-volatile acids include phosphorous acid, phosphoric acid, sulfiric acid, and metal "oxo acids" such as the oxo acids of germanium, antimony, niobium and the like. Salts of non-volatile acids include alkali metal salts of phosphites; alkaline earth metal salts of phosphites; alkali metal salts of phosphates; alkaline earth metal salts of phosphates, alkali metal salts of sulfates, alkaline earth metal salts of sulfates, alkali metal salts of metal oxo acids, and alkaline earth metal salts of metal oxo acids. Specific examples of salts of non-volatile acids include $NaH_2PO_3$, $NaH_2PO_4$, $Na_2HPO_4$, $KH_2PO_4$, $CsH_2PO_4$, $Cs_2HPO_4$, $NaKHPO_4$, $NaCsHPO_4$, $KCsHPO_4$, $Na_2SO_4$, $NaHSO_4$, $NaSbO_3$, $LiSbO_3$, $KSbO_3$, $Mg(SbO_3)_2$, $Na_2GeO_3$, $K_2GeO_3$, $Li_2GeO_3$, $MgGeO_3$, $Mg_2GeO_4$, and combinations comprising one or more of the foregoing compounds.

In various embodiments, the amount of tetraalkylphosphonium compound employed can be about 1 micro equivalents to about 1000 micro equivalents based on the amount of aromatic dihydroxy compound. Particularly, about 10 micro equivalents to about 500 micro equivalents can be employed. More particularly, about 50 micro equivalents to about 150 micro equivalents can be employed.

The amount of alkali element compound, an alkaline earth metal compound, or combination comprising one or more of the foregoing catalysts is employed can be about $1\times10^{-7}$ moles to about $2\times10^{-3}$ moles, specifically about $1\times10^{-6}$ to about $4\times10^{-4}$ moles for each mole of the combination of the aromatic dihydroxy compound comonomer and the carbonic acid diester.

When a quaternary phosphonium compound is used as one of the polymerization catalysts, it decomposes at temperatures greater than or equal to about 180° C. yielding non ionic compounds such as a quaternary phosphine oxide and phosphate esters. For example, when tetrabutylphosphonium acetate is employed as the quaternary phosphonium compound, tributyl phosphine oxide (TBPO) and phosphate esters are produced. TBPO, however, is volatile and can be vaporized under the conditions of the polymerization reaction. During processing, because TBPO has a similar vapor pressure as diphenyl carbonate, for example, a significant amount of the TBPO can be distilled with the diphenyl carbonate. A fraction of the TBPO generated thus can be recycled with recovered diphenyl carbonate.

In an embodiment of making polycarbonate, the bisphenol compound and the carbonate diester can be reacted at atmospheric pressure during the first stage reaction at a temperature of about 80° C. to about 250° C., particularly at a temperature of about 100° C. to about 230° C., and more particularly at a temperature of about 120° C. to about 190° C., and in general for 0 to about 5 hours, particularly for 0 to about 4 hours, and even more particularly for 0 to about 3 hours. The reaction temperature is then raised, while the reaction system is reduced in pressure, thus bringing about a reaction between the bisphenol and the carbonic acid diester, and finally the bisphenol, the carbonic acid diester, and their oligomers are subjected to a polymerization reaction at a temperature of about 240° C. to about 320° C. under reduced pressure of less than or equal to about 5 millimeters of mercury (mm Hg).

The manufacturing method can be either a continuous or batch process. The reaction apparatus used in conducting this reaction can be a horizontal type, tube type, or column type. In an embodiment, there can be at least two polymerization stages, although there are no particular restrictions on the number of stages.

In an exemplary embodiment, the apparatus in which the reaction is carried out can be a multistage reactor comprising any suitable type of tank, tube, and/or column. Such reactors can be vertical stirred tank polymerization reactors, thin film evaporative polymerization reactors, horizontal stirred reactors, twin screw vented extruders, reactive distillation columns, and the like, as well as combinations comprising at least one of the foregoing reactors.

Referring now to FIG. 1, a schematic diagram of an exemplary embodiment for a process flow suitable for the practice of the present method generally designated 100 is illustrated. The carbonic acid diester and the aromatic dihydroxy compound along with the quaternary phosphonium compound and optionally other polymerization catalysts, are mixed in the monomer mix drum 14. It is noted that in an embodiment the carbonic acid diester is diphenyl carbonate (DPC), which can be supplied to mix drum 14 via DPC plant 12, as will be discussed in greater detail below. The polymerization reaction to make polycarbonate can occur in a multistage reactor system comprising a first reactor 16, a second reactor 18, a third reactor 20, and a fourth reactor 22 connected in series and operated at increasing temperature (i.e., a reactor down stream is operated at a greater temperature than a reactor upstream) of about 150° C. to about 400° C., particularly about 250° C. to about 350° C.; and decreasing pressure (i.e., a reactor down stream is operated at a lower pressure than a reactor upstream) of about 500 Torr to about 0.01 Torr. For example, first reactor 16 is maintained at a temperature greater than or equal to about 200° C. and fourth reactor 22 is maintained at a temperature less than or equal to about 350° C. Moreover, first reactor 16 is maintained at a pressure less than or equal to about 500 Torr and fourth reactor 22 is maintained at a pressure greater than or equal to about 0.01 Torr. This method allows phenol byproduct to be removed, while building high molecular weight polycarbonate, e.g., with number average molecular weight greater than or equal to about 7,000 atomic mass units (amu).

Reactors 16, 18, 20, and 22 are configured to allow removal of byproducts (e.g., phenol) as an overhead (byproduct) stream 24, 26, 28, and 30 respectively for each reactor. As will be discussed in greater detail, additional separation methods are used to further separate the byproducts contained in overhead streams 24, 26, 28, and 30. For example, phenol can be separated from overhead stream 24 from first reactor 16. More particularly, overhead stream 24 is fed to a purification device (e.g., scrubber 44) in fluid communication with first reactor 16. Scrubber 44 comprises a bottom stream 46 and top stream 48. Bottom stream 46 can comprise diphenyl carbonate (DPC), bisphenol A (BPA), and quaternary phosphonium compound (e.g., tetrabutylphosphonium acetate (TBPA)) decomposition products, which can be fed back to reactor 16. Top stream 48 comprises greater than or equal to about 99 wt. % phenol, wherein the weight percent of phenol is based upon a net weight of the phenol separated in scrubber 44, and a phosphorous concentration of less than or equal to about 3 part per million by weight (ppm), more particularly less than or equal to about 1 ppm by weight. The phenol recovered in top stream 48 can be recycled to DPC plant 12 without further purification.

Additionally, phenol can be separated from overhead streams 26, 28, and 30, which can comprise phenol, diphenyl carbonate, bisphenol A, and quaternary phosphonium compound decomposition products. When the quaternary phosphonium compound is tetrabutylphosphonium acetate, the majority (i.e., greater than about 50 wt. %) of the tetrabutylphosphonium acetate decomposition products comprise tributyl phosphine oxide (TBPO). At the above specified reaction conditions, TBPO is relatively volatile and can be vaporized, aiding in its separation. Overhead streams 26, 28, and 30 can be collectively fed to a recovery system (e.g., purification system) comprising a first purifying column 32 and a second purifying column 34.

First purifying column 32 is in serial fluid communication with second purifying column 34. Purifying columns (32 and 34) can be, for example, distillation columns. Moreover, first purifying column 32 comprises a top stream 36 and a bottom stream 40, wherein top stream 36 comprises greater than or equal to about 99 wt. % phenol, wherein the weight percent of phenol is based upon a net weight of the phenol separated in the first purifying column 32, and a phosphorous concentration of less than or equal to about 3 ppm by weight, more particularly less than or equal to about 1 ppm by weight. The phenol recovered in top stream 36 can be recycled to the DPC plant 12 without further purification. Bottom stream 40 can comprise residual phenol, diphenyl carbonate, bisphenol A, and quaternary phosphonium compound decomposition products (e.g., tributyl phosphine oxide), which is fed to second purifying column 34.

First purifying column 32 can be operated under conditions suitable to obtain the desired separation of phenol. For example, the first purifying column 32 can be operated at a temperature of about 100° C. to about 220° C., a pressure of about 90 millibars (mbar) to about 150 mbar, and a reflux ratio of about 0.5 to about 5.

Second purifying column 34 comprises a top stream 38 and a bottom stream 42, wherein top stream 38 comprises greater than or equal to about 90 wt. % phenol, wherein the weight percent of phenol is based upon a net weight of the phenol separated in the second purifying column 34, and a phosphorous concentration of less than or equal to about 3 ppm by weight, more particularly less than or equal to about 1 ppm. The phenol recovered in top stream 38 can be recycled to the DPC plant 12 without further purification. Bottom stream 42 can comprise diphenyl carbonate, bisphenol A, and quaternary phosphonium compound decomposition products (e.g., tributyl phosphine oxide).

Second purifying column 34 can be operated under conditions suitable to obtain the desired separation of phenol. For example, the second purifying column 34 can be operated at a temperature of about 70° C. to about 220° C., a pressure of about 20 mbar to about 100 mbar, and a reflux ratio of about 2 to about 20.

EXAMPLES

The samples were analyzed on a Varian Liberty II ICP-AES for the determination of the phosphorus concentration. The analyte concentrations were calculated by comparison with a known series of external calibration standards and a check with a standard prepared from another source. The instrument was calibrated with matrix-matched standards: 20 ppm, 10 ppm, 4 ppm, and 0.5 ppm for phosphorus.

Example 1

Figure 2:
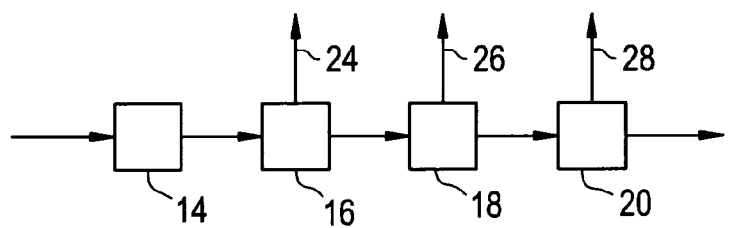
FIG. 2 is a schematic diagram of an exemplary embodiment of a reactor system for making polycarbonate.

In this example, a laboratory continuous reaction system (2 kilograms per hour (kg/hr) polymer throughput) was used. The apparatus used in this example is illustrated schematically in FIG. 2, which is a simplified version of the process scheme shown in FIG. 1, comprising three reactors.

Bisphenol A and diphenyl carbonate, in a molar ratio of 1.08:1, were continuously supplied to mix drum 14 where a uniform solution was produced. About 75 micro equivalents (µeq) ($75 \times 10^{-6}$ mol/mol of bisphenol A) of tetrabutylphosphonium acetate and 0.9 µeq ($0.9 \times 10^{-6}$ mol/mol bisphenol A) of sodium hydroxide (NaOH) were added to the solution as catalyst. The solution was then successively supplied to the pre-polymerization tanks (i.e., first reactor 16 and second reactor 18) and horizontally agitated polymerization tank (i.e., third reactor 20) arranged in sequence, so that polymerization to produce the polycarbonate was allowed to proceed. The reaction conditions in the tanks are as shown in Table 1:

TABLE 1

| Equipment | Temperature (° C.) | Pressure (mbar) |
| --- | --- | --- |
| Agitation tank (14) | 160 | Atmospheric |
| Pre-polymerization tank I (16) | 210 | 180 |
| Pre-polymerization tank II (18) | 260 | 25 |
| Polymerization tank I (20) | 300 | 3 |

In this example, the phosphorus concentration was measured in the overheads of the reactors as it is shown in Table 2.

TABLE 2

| TBPA added (µeq) | Phosphorus (ppm) in byproduct stream 24 | P (ppm) in byproduct stream 26 | P (ppm) in byproduct stream 28 |
|---|---|---|---|
| 50 | <0.5 | 12 | 20 |
| 75 | <0.5 | 18 | 30 |

The phenol collected from overhead (byproduct) stream 24 from first reactor 16 having a flow rate of approximately 1.2 kg/hr was virtually free from phosphorus (i.e., the phosphorus concentration was less than the detection limit), and could be recycled for making diphenyl carbonate after separating out a small amount of DPC (e.g., less than about 5 wt. %). At those operating conditions, a scrubber was not needed to insure that no significant quantity of phosphorus would contaminate the phenol in byproduct stream 24.

Example 2

In this example, a pilot facility for the production of melt polycarbonate was used. The process flow diagram is according to FIG. 1. Molten bisphenol A supplied directly via pipe from bisphenol A production equipment (feed rate 37.5 kg/hr), molten diphenyl carbonate supplied directly via pipe following distillation (DPC: feed rate 35.5 kg/hr), and $1.5 \times 10^{-4}$ moles of tetrabutylphosphonium acetate (TBPA) per mol of bisphenol A and $0.9 \times 10^{-6}$ moles of sodium hydroxide (NaOH) per mol of bisphenol A were continuously supplied to the stirring tank (14). These were continuously provided to first reactor 16, second reactor 18, third reactor 20, and fourth reactor 22 and polymerization was conducted under the operating conditions shown in Table 3 below:

TABLE 3

| Equipment | Temperature (° C.) | Pressure (mbar) |
|---|---|---|
| Agitation tank (14) | 160 | Atmospheric |
| Pre-polymerization tank I (16) | 230 | 180 |
| Pre-polymerization tank II (18) | 270 | 30 |
| Polymerization tank I (20) | 290 | 3 |
| Polymerization tank II (22) | 295 | 1 |

In this example, the phosphorus concentration was measured in the byproduct streams of the reactors as it is shown in Table 4.

TABLE 4

| TBPA added (µeq) | P (ppm) in byproduct stream 24 | P (ppm) in byproduct streams 26 + 28 + 30 |
|---|---|---|
| 150 | <0.5 | 75 |
| 100 | <0.5 | 70 |
| 65 | <0.5 | 51 |

The phenol collected from the scrubber (byproduct stream 48 stream from scrubber 44, having a flow rate of approximately 25 kg/hr) was virtually free from phosphorus (i.e., the phosphorus concentration was less than the detection limit), and could be recycled for making diphenyl carbonate.

Advantageously, the methods disclosed herein minimize the amount of organic phosphorous recycled, thereby reducing the amount of organic phosphorous in the polycarbonate. It is noted that organic phosphorous in polycarbonate can be oxidized/hydrolyzed to phosphoric acid derivatives, which can cause hydrolytic stability issues in the polycarbonate resin. By reducing the organic phosphorous in the polycarbonate, these hydrolytic stability issues can advantageously be reduced.

While the present invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the invention scope thereof. It is, therefore intended that the invention not be limited to the particular embodiment disclosed as the best mode contemplated for carrying out this invention, but that the invention will include all embodiments falling within the scope of appended claims.

What is claimed is:

1. A method of making polycarbonate, comprising:
    melt-polymerizing an aromatic dihydroxy compound and a carbonic acid diester in a presence of a polymerization catalyst in a reactor system producing a byproduct stream, wherein the polymerization catalyst comprises a quaternary phosphonium compound; and
    purifying the byproduct stream to separate phenol, wherein the separated phenol has a phosphorus concentration of less than or equal to about 3 ppm.

2. The method of claim 1, wherein the phosphorous concentration is less than or equal to about 1 ppm.

3. The method of claim 1, wherein the dihydroxy compound is a bisphenol, wherein the carbonic acid diester is diphenyl carbonate, and wherein the quaternary phosphonium compound is tetrabutylphosphonium acetate.

4. The method of claim 1, further comprising recycling the separated phenol to a DPC plant; making diphenyl carbonate in the DPC plant, feeding the diphenyl carbonate to the reactor system.

5. The method of claim 1, wherein the reactor system comprises a first reactor and a second reactor disposed downstream of the first reactor, wherein the first reactor and the second reactor are each operated at a temperature of about 150° C. to about 400° C., and wherein a second reactor temperature is greater than a first reactor temperature.

6. The method of claim 5, wherein the first reactor comprises a first reactor overhead stream in fluid communication with a scrubber.

7. The method of claim 5, wherein the reactor system further comprises a third reactor disposed downstream of the second reactor and a fourth reactor disposed downstream of the third reactor, wherein the second reactor and the third reactor are each operated at about 250° C. to about 350° C., and wherein a third reactor temperature is greater than a second reactor temperature and a fourth reactor temperature is greater than the third reactor temperature.

8. The method of claim 1, wherein purifying the byproduct stream from the reactor system further comprises passing the byproduct stream through a purification system comprising a series of purifying columns to separate diphenyl carbonate.

9. The method of claim 8, wherein the byproduct stream comprises phenol, bisphenol A, diphenyl carbonate, and quaternary phosphonium compound decomposition products.

10. The method of claim 9, wherein the purification system comprises a first purifying column and a second purifying column disposed downstream of and in fluid communication with the first purifying column.

11. The method of claim 10, wherein the first purifying column is operated at a first purifying column temperature of about 100° C. to about 220° C., a first purifying column pressure of about 90 mbar to about 150 mbar, and a first purifying column reflux ratio of about 0.5 to about 5.

12. The method of claim 11, wherein the second purifying column is operated at a second purifying column temperature of about 70° C. to about 220° C., a second purifying column pressure of about 20 mbar to about 100 mbar, and a second purifying column reflux ratio of about 2 to about 20.

13. The method of claim 10, wherein a first top stream of the first purifying column comprises greater than or equal to about 99 wt. % phenol and less than or equal to about 3 ppm phosphorous, wherein weight percent of the phenol is based upon a net weight of the phenol separated in the first purifying column.

14. The method of claim 13, wherein the phosphorous concentration is less than or equal to about 1 ppm.

15. The method of claim 10, wherein a second top stream of the second purifying column comprises greater than or equal to 90 wt. % phenol and less than or equal to about 3 ppm phosphorous, wherein weight percent of the phenol is based upon a net weight of the phenol separated in the second purifying column.

16. The method of claim 12, wherein the phosphorous concentration is less than or equal to about 1 ppm.

17. A method for making polycarbonate, comprising:
melt-polymerizing bisphenol A and diphenyl carbonate in the presence of tetrabutylphosphonium acetate and sodium hydroxide in a multistage reactor comprising a first reactor, a second reactor disposed downstream of the second reactor, a third reactor disposed downstream of the second reactor, and a fourth reactor disposed downstream of the third reactor, wherein the first reactor comprises a first reactor byproduct stream, wherein the second reactor comprises a second reactor byproduct stream, wherein the third reactor comprises a third reactor byproduct stream, and wherein the fourth reactor comprises a fourth reactor byproduct stream;

separating phenol from the first reactor byproduct stream using a scrubber disposed in fluid communication with the first reactor;

separating phenol from the second, third, and fourth byproduct streams using a first distillation column, wherein the first distillation column produces a first top stream and a first bottom stream, wherein the first top stream comprises greater than or equal to about 99 wt. % phenol and less than or equal to about 3 ppm phosphorous, wherein the weight percent of the phenol is based upon a net weight of the phenol separated in the first purifying column; and separating phenol from the first bottom stream using a second distillation column, wherein the second distillation column produces a second top stream and a second bottom stream, wherein the second top stream comprises greater than or equal to 90 wt. % phenol and less than or equal to about 3 ppm phosphorous, wherein the weight percent of phenol is based upon a net weight of the phenol separated in the second purifying column.

18. The method of claim 17, wherein the phosphorous concentration in each of the first top stream and the second top stream are less than or equal to about 1 ppm.

19. The method of claim 17, wherein the first distillation colunm is operated at a first distillation column temperature of about 100° C. to about 220° C., a first distillation column pressure of about 90 mbar to about 150 mbar, and a first distillation column reflux ratio of about 0.5 to about 5.

20. The method of claim 17, wherein the second distillation column is operated at a second distillation column temperature of about 70° C. to about 220° C., a second distillation column pressure of about 20 mbar to about 100 mbar, and a second distillation column reflux ratio of about 2 to about 20.

* * * * *